United States Patent Office 2,886,411
Patented May 12, 1959

2,886,411

PROCESS FOR THE MANUFACTURE OF CALCIUM CARBIDE AND CALCIUM CYANAMIDE

Franz Kaess, Trostberg, Germany, assignor to Suddeutsche Kalkstickstoff-Werke A.G., Trostberg, Germany No Drawing. Application January 12, 1953
Serial No. 330,897

3 Claims. (Cl. 23—78)

The invention relates to improvements in the manufacture of calcium carbide and in its subsequent nitrogenation.

Calcium carbide is prepared from lime and carbon, for instance anthracite, and fluxes have been added to the reaction mixture in order to lower the melting temperature of the charge. It has been the generally accepted assumption that such fluxes must be added in finely dispersed state to obtain the desired result. The flux mostly used for this purpose has been powdery calcium fluoride.

It has been found, however, that the finely dispersed flux does not remain in the carbide forming mixture but that it is almost completely blown out of the furnace by the carbon monoxide generated in the reaction $$CaO + 3C = CaC_2 + CO$$

Consequently the action of the flux cannot take place to the desired extent in the carbide furnace and still less in the subsequent nitrogenation of the obtained calcium carbide. It has, therefore, been necessary to add again fluxes such as calcium fluoride to the calcium carbide in order to obtain improved yields of calcium cyanamide in the subsequent nitrogenation process $CaC_2 + N_2 = CaCN_2 + C$.

This drawback is obviated by the present invention, according to which the flux, i.e. preferably calcium fluoride, is added in granular form. The size of the granules is 3 to 15, preferably 5 to 10 mm. It is sufficient to add calcium fluoride in amounts of 1.5 to 3.5 percent of weight of the charge; I prefer to use about 2.5 percent.

A particular advantage of the new process is that it is not necessary to prepare an intimate mixture of the flux with the calcium carbide. Quite unexpectedly, even better results are obtained when the flux is arranged in spaced layers in the column of the carbide forming charge, which is converted to calcium carbide in an electric resistance furnace.

If the carbide process is carried out in the described manner, the softening point of the calcium carbide, particularly of high percent $CaC_2$, is lowered from 2000° C. by about 200 to 300° C., which results in a considerable saving of energy and installation cost.

Calcium carbide prepared by the conventional procedure with addition of flux in powdered or dissolved form does no longer contain said flux because it has been blown out by the carbon monoxide. Calcium carbide obtained according to the process of the invention contains calcium fluoride approximately in the same amount as originally added. The latter calcium carbide is readily nitrogenated to calcium cyanamide without any further additions, and it has been found that the azotability of such calcium carbide, i.e. the actual yield of calcium cyanamide obtained on nitrogenation in percent of the theoretical yield, is considerably higher than that of calcium carbide prepared by conventional methods.

For the high nitrogenation of calcium carbide prepared by the prior art methods, the admixture of promoting agents to the calcium carbide is required; usually, a mixture of calcium cyanamide with calcium fluoride or calcium chloride is used as such promoting agent or catalyst to improve the fixation of nitrogen. The new process of the invention renders such admixtures unnecessary; on the contrary, the azotability of the obtained calcium carbide is higher without the admixture of said promoting agents.

The new process is particularly economic because the granulated calcium fluoride added to the calcium carbide forming starting materials exerts a two-fold function; on the one hand it lowers the softening point of the carbide, i.e., also its production cost, and on the other hand it improves the nitrogen fixation of the obtained carbide.

The calcium carbide is prepared in the conventional electric furnace. The most convenient manner of carrying out the method of the invention consists in filling the furnace with the carbide-forming mixture and in interposing spaced layers of calcium fluoride of a grain size within the range of 3 to 15 mm.; the amount of added calcium fluoride should be about 1.5 to 3.5 percent by weight of the carbide-forming mixture.

The following examples are given to illustrate by way of example the new process in comparison with the conventional procedure. The electric furnace used had a cross section of about 30 m.$^2$ and was filled to a height of about 2.2 m.

Example 1

Burnt lime and coke are molten in a known manner in an electric furnace to calcium carbide containing 90 percent of $CaC_2$. The melting point of the carbide is 1950 to 2000° C. By nitrogenation, a product containing 17.5 percent of nitrogen and 32.5 percent of residual carbide is obtained. The azotability is 94.1 percent, if the nitrogenation is carried out without the addition of calcium cyanamide.

These figures are not, or only slightly, changed if powdery calcium fluoride is added to the carbide-forming mixture, because the calcium fluoride is completely blown out by the developed carbon monoxide.

Example 2

A carbide-forming mixture of lime and coke is filled into the electric furnace. During the filling operation, layers of granulated calcium fluoride are interposed in suitable intervals of, for instance, 10 to 15 cm. The grain size of the calcium fluoride is 5 to 10 mm., and the total amount of added calcium fluoride is 2.5 percent by weight calculated on the total carbide-forming mixture.

The obtained carbide has a melting point of 1750 to 1800° C., and contains 85.8 percent of calcium carbide. The nitrogenation is carried out under the same conditions as in Example 1, i.e. without the addition of any nitrogenation accelerators, and results in a product containing 27 percent of nitrogen and 0.2 percent of residual carbide. The azotability is 99.8 percent.

If the amount of added calcium fluoride is increased, for instance to 3.5 percent, under the same conditions as stated hereinbefore, the following figures are obtained: $CaC_2$ content: 80.7 percent; melting point of the calcium carbide: 1700 to 1750° C.; azotability: 96.5 percent. The nitrogenated product contains 25.2 percent of nitrogen and 0.04 percent of residual carbide.

The addition of 5 percent of calcium fluoride, under the same conditions, gives the following results: $CaC_2$ content: 65 percent; melting point: 1675 to 1700° C.; after nitrogenation 20 percent of nitrogen and 0.2 percent of residual carbide; azotability 90 percent.

What I claim is:

1. A method of preparing a calcium carbide composition of improved meltability and azotability comprising charging an electric furnace with a mixture of lime and a carbonaceous material, interposing spaced layers of granulated calcium fluoride in said charge, the size of said calcium fluoride granules being within the range of about 3 to 15 mm., and melting the charge.

2. A method of preparing calcium cyanamide comprising charging an electric furnace with a mixture of lime and a carbonaceous material, interposing spaced layers of granulated calcium fluoride having a grain size of about 3 to 15 mm. in said charge, melting the charge, and subjecting the thus obtained calcium carbide-containing composition without further additions to nitrogenation.

3. A method of preparing calcium cyanamide comprising charging an electric furnace with a carbide forming mixture of lime and a carbonaceous material, interposing spaced layers of granulated calcium fluoride having a grain size of about 3 to 15 mm. in said charge, the amount of the calcium fluoride being about 1.5 to 3.5 percent by weight of the charge, melting the charge, and subjecting the thus obtained calcium carbide containing composition without further additions to nitrogenation.

References Cited in the file of this patent

UNITED STATES PATENTS

| 557,057 | Dickerson | Mar. 24, 1896 |
| 1,021,445 | Bonnington et al. | Mar. 26, 1912 |

FOREIGN PATENTS

| 501,364 | Belgium | Mar. 15, 1951 |
| 487,928 | Canada | Nov. 11, 1952 |

OTHER REFERENCES

Kirk et al.: "Encyclopaedia of Chemical Technology," 1948, vol. 2, page 841.